(72.)

S. E. TOMPKINS & JOHN MACLURE.

Harness Saddle Trees.

No. 4,699. Reissued Jan. 2, 1872.

Witnesses:

A. M. Malcomson Jr.

John T. Smith

Inventor:

Samuel E. Tompkins
by John Maclure
Cochrane & Sodel
their Attorneys.

AM. PHOTO-LITHOGRAPHIC CO. N.Y. (OSBORNE'S PROCESS.)

UNITED STATES PATENT OFFICE.

SAMUEL E. TOMPKINS, OF SING SING, NEW YORK, AND JOHN MACLURE, OF NEWARK, NEW JERSEY, ASSIGNORS TO SAMUEL E. TOMPKINS.

IMPROVEMENT IN HARNESS SADDLE-TREES.

Specification forming part of Letters Patent No. 22,841, dated February 1, 1859; reissue No. 4,699, dated January 2, 1872.

*To all whom it may concern:*

Be it known that we, SAMUEL E. TOMPKINS, of Sing Sing, in the State of New York, and JOHN MACLURE, of the city of Newark, in the State of New Jersey, have invented a new and useful Improvement in the Construction of Harness Saddle-Trees; and we do hereby declare that the following is a full, clear, and exact description of the same, reference being had to the annexed drawing making a part of this specification, in which—

Figure 1:
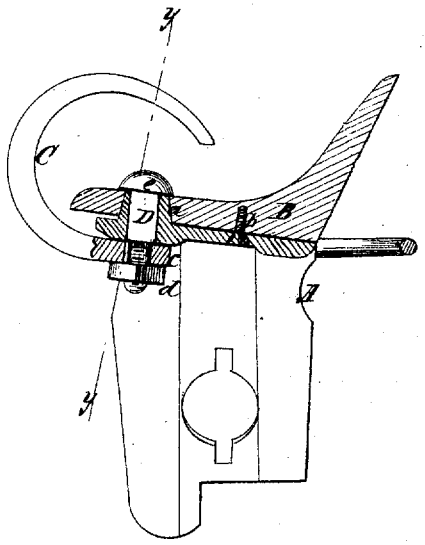
Figure 2:
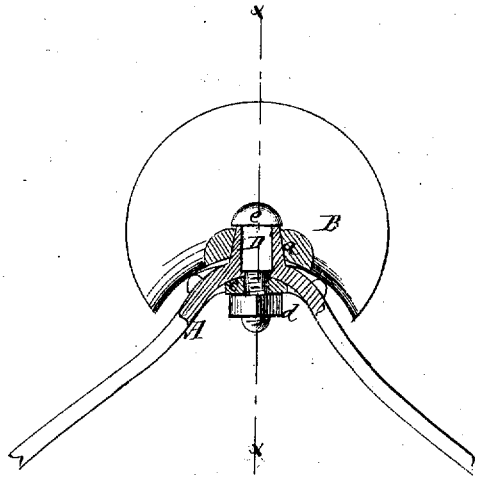
Figure 3:
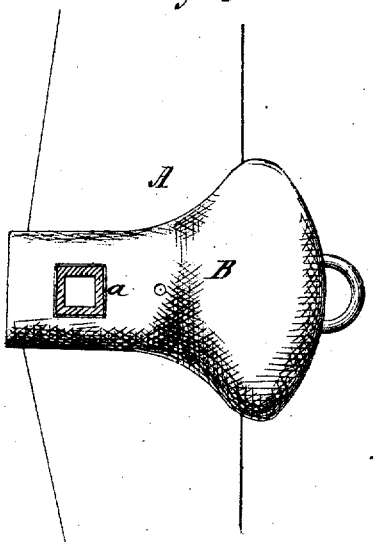

Figure 1 is a vertical section of our invention taken on the line *x x*, Fig. 2. Fig. 2 is a section of same taken in line *y y*, Fig. 1. Fig. 3 is a plan or top view of same.

Similar letters of reference indicate corresponding parts in the several figures.

This invention relates to means for attaching the seat-block of the saddle-tree to the tree, whereby a seat-block, constructed of wood or other analogous material, is secured to said tree equally as firm and without any greater liability to work loose than the ordinary metallic seat-block.

The employment of wooden seat-blocks for harness saddle-trees is desirable, as it renders the tree much lighter than those composed of metal, is more durable, and the construction of such tree is thereby greatly facilitated. It also admits of being covered so as to give a saddle equally as symmetrical as any other known form.

To enable those skilled in the art to fully understand and construct our invention, we will proceed to describe it.

A represents the bow or sides of the tree, which is constructed of cast metal and of the usual or approximate form. This bow or tree, at its upper part and on the curve near its front end, has a projection, *a*, which is shown in the drawing as being of a square tubular form. B is the seat-block, shown as constructed of wood. This seat-block may be of the usual size and form, and it is adjusted and secured at its rear end to the top or curved part of the tree by a screw, *b*, inserted in an inverted direction, passing up through the tree into the seat-block. A recess or opening is made in the front end of the seat-block to allow the projection *a* attached to the tree to pass through, the upper end of said projection being flush with the upper surface of the seat-block, as shown in Figs. 1 and 2. C is the check-rein hook, which is curved as usual, the upper part extending over toward the center of the seat-block. The lower end of the hook has an eye, *c*, made in it, and a bolt, D, passes through the projection *a* and through the eye *c* of the check-rein hook, a nut, *d*, being fitted on the lower end of the bolt D. The head *e* of the bolt D rests or bears on the upper surface of the projection *a*, as shown in Figs. 1 and 2, the bolt and check-rein hook not being shown in Fig. 3. The nut *d*, it will be seen, firmly secures the check-rein hook to the tree, and the head *e* retains the front part of the seat-block B on the projection *a;* at the same time the head *e* is prevented from bearing on the seat-block in consequence of the projection *a*. The bolt D, therefore, cannot injure the seat-block, which is the case with the ordinary construction, the seat-block being composed of wood or other soft material, for no part of the bolt is in direct contact with the seat-block; and the nut *d* may be screwed up as tightly as may be desired, or as occasion may require, in order to firmly attach the check-rein hook C to the tree, no strain or pressure being in consequence brought to bear upon said seat-block.

We would remark that it is not essential that a hollow projection, *a*, with four sides, be always employed, as one or more sides may be used and will effect the object equally as well.

Having thus described our invention, what we claim as new, and desire to secure by Letters Patent, is—

A projection attached to the tree passing through a recess in the seat-block, substantially as described, in order to take the strain of the bolt passing through such recess from off of the seat-block.

SAML. E. TOMPKINS.
JOHN MACLURE.

Witnesses:
A. B. MALCOMSON,
SAM. TRO. SMITH.